Aug. 16, 1949. W. H. CHURCHILL 2,479,312
CORD FASTENER
Filed Feb. 16, 1945

Inventor
Wilmer H. Churchill.
By Walter P. Jones
Attorney

Patented Aug. 16, 1949

2,479,312

UNITED STATES PATENT OFFICE 2,479,312

CORD FASTENER

Wilmer H. Churchill, Saugus, Mass., assignor to United-Carr Fastener Corporation, Cambridge, Mass., a corporation of Massachusetts Application February 16, 1945, Serial No. 578,172

1 Claim. (Cl. 24—129)

The present invention relates to improvements in cord fasteners, such as are used for bale and package ties, helmet chin cord sliders, and the like, and the invention aims generally to improve existing ties of that type.

The invention has for its principal aim and object to provide a simple and efficient fastener that will be simple in construction, cheap in the cost of manufacture, and one which will provide a positive and effective clamp for a cord.

These and other objects of the invention will be apparent to persons skilled in the art from a consideration of the accompanying drawings and annexed specification illustrating and describing a preferred embodiment of the invention.

Figure 1:
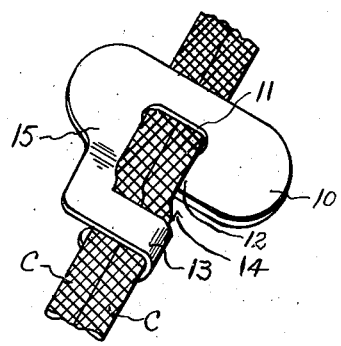
Fig. 1 is a perspective view of the improved cord fastener as applied to grip and clamp a pair of cords.
Figure 2:
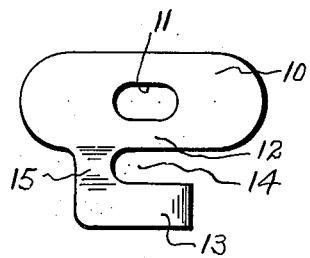
Fig. 2 is a front elevation of the cord fastener.

The fastener shown in the drawings as illustrative of the invention may be formed of any suitable material such as plastic, sheet metal, fibre and the like, and comprises a body portion 10 apertured as at 11 to provide for the ready passage of one or more cords C as is desired. In the present instance, two cords are shown as typical of a pair of cords commonly employed as helmet chin cords, and the fastener may function as a slider to tighten the chin cords under the wearer's chin and then clamped to the cords in adjusted position. As illustrated, the body portion 10 may be in the form of a disc of thin, relatively stiff sheet material, and the aperture 11 may be elongated, and preferably centrally disposed therein to provide cord bearing surfaces 12 adjacent the aperture.

The fastener provides a cord-gripping portion preferably in the form of a U-shaped hook member 13 and spaced from the bearing portion 12 by a throat 14. Preferably the gripping portion is joined to the body 10 by a bridge or connection 15 disposed non-axially of the aperture 11 and hook 13. Thus the throat 14 is open at one side of the fastener to facilitate easy passage of the cord or cords therein.

Figure 3:
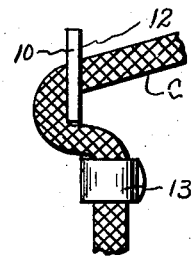
Fig. 3 is a right hand edge view of the fastener illustrating the position of the cord in clamped position therewith.
Figure 4:
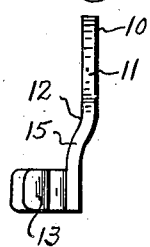
Fig. 4 is a left hand edge view of the fastener.
Figure 5:
Fig. 5 is an edge view of the fastener as viewed from the top of Fig. 2.

The bridge or connection is preferably bent so as to dispose the hook 13 out of the plane of the body portion 10, as shown in Figs. 3 and 4 and the hook member preferably opens on that side of the fastener opposite the opening of the throat 14.

In use, one or more cords, as is desired, are passed through the aperture 11 of the body 10 and in this position the fastener may slide freely along the cord to the desired adjusted position. One end of the cord may then be moved laterally in the throat 14 and hooked in the hook member 13, as shown in Figs. 1 and 3. In this position the cord is held tightly against the bearing surface 12 and is then clamped in the hook portion out of the plane of the bearing surface 12 to securely clamp the cord against any slippage.

Preferably the width of the throat 14 is substantially equal to the diameter of the cord so that an abrupt bend is made in the cord, and the hook member is preferably formed of resilient material and slightly constricted adjacent its throat so that the cord may be forced therein and gripped by the hook with a snap fastener action, which effectively resists any tendency of the cord to slip out of the hook member 13.

The invention provides an extremely simple and efficient cord fastener which provides a positive and secure clamp for a cord or the like.

The invention is not to be restricted to the particular construction shown which is intended merely as illustrative, and the scope of the invention is best defined in the appended claim.

I claim:

A cord fastener made of a single piece of thin sheet material comprising a body portion in the form of a plate having an aperture for the passage of one or more cords, a bridge portion extending from an edge of said body portion at an obtuse angle thereto, and a cord-gripping clip having opposing legs connected by a bight portion, said legs being disposed in superposed relation to each other in substantially parallel planes substantially parallel said body portion and disposed below the plane of said body portion, the side edge adjacent said body portion at the free end of the one of said legs adjacent said body being connected to the end of said bridge portion opposite said body portion providing between said body portion and said clip a U-shaped cord passage whereby one or more cords may be held by said clip and bent up through said cord passage and down through said aperture.

WILMER H. CHURCHILL.

REFERENCES CITED

The following references are of record in the file of this patent:

UNITED STATES PATENTS

| Number    | Name     | Date           |
|-----------|----------|----------------|
| 153,469   | Wright   | July 28, 1874  |
| 429,409   | Beals    | June 3, 1890   |
| 1,480,006 | Ortman   | Jan. 8, 1924   |
| 1,546,798 | Seagren  | July 21, 1925  |
| 2,151,664 | Redfield | Mar. 21, 1939  |
| 2,246,229 | Wohlmuth | June 17, 1941  |